US006366553B1

(12) United States Patent
Takahashi (10) Patent No.: US 6,366,553 B1
(45) Date of Patent: *Apr. 2, 2002

(54) DISK CARTRIDGE WITH DISK SUPPORT MEMBERS HAVING HIGH WEAR RESISTANCE AND LUBRICITY

(75) Inventor: Kenji Takahashi, Tochigi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/700,526
(22) PCT Filed: Dec. 28, 1995
(86) PCT No.: PCT/JP95/02771
  § 371 Date: Aug. 23, 1996
  § 102(e) Date: Aug. 23, 1996
(87) PCT Pub. No.: WO96/21224
  PCT Pub. Date: Jul. 11, 1996

(30) Foreign Application Priority Data

Dec. 29, 1994 (JP) .............................................. 6-340580

(51) Int. Cl.⁷ ............................................. G11B 23/03
(52) U.S. Cl. ...................................... 369/291; 360/133
(58) Field of Search .......................... 360/133; 369/289, 369/290, 291; 206/307, 308.1, 308.3, 309, 312, 313

(56) References Cited

U.S. PATENT DOCUMENTS

| 4,863,031 A | * | 9/1989 | Tanaka et al. ............... 369/291 |
| 5,084,861 A | * | 1/1992 | Takahashi ................... 360/133 |
| 5,121,380 A | * | 6/1992 | Fujita et al. ................. 369/291 |
| 5,175,726 A | * | 12/1992 | Imokawa ..................... 369/291 |
| 5,447,768 A | * | 9/1995 | Takahashi ................... 360/135 |
| 5,717,684 A | * | 2/1998 | Akiyama et al. ........... 369/291 |

FOREIGN PATENT DOCUMENTS

JP         4109475       * 4/1992

* cited by examiner

Primary Examiner—David L. Ometz
(74) Attorney, Agent, or Firm—Oblon, Spivak, McClelland, Maier & Neustadt, P.C.

(57) ABSTRACT

A disk cartridge provided with a cartridge body formed by mating and connecting an upper half and a lower half and accommodating a disk on which are recorded data signals. Disk supports are provided, corresponding to the non-signal recording region of the inner periphery of the disk accommodated in the cartridge body, at the inside surfaces of the cartridge body. At the surfaces of the disk supports facing the disk, disk support members having a high wear resistance and a high lubricity are provided and are spread in a ring-like manner at predetermined intervals from each other. The Disk support members are formed from sheet-like members of ultra-high molecular weight polyethylene or sheet-like members comprised of polyfluoroethylene fibers. By providing the disk support members spread out in this way, it becomes possible to reliably and easily attach them to the disk supports.

5 Claims, 9 Drawing Sheets

DISK CARTRIDGE WITH DISK SUPPORT MEMBERS HAVING HIGH WEAR RESISTANCE AND LUBRICITY

FIELD OF THE INVENTION

The present invention relates to a disk cartridge for accommodating in a cartridge body an optical disk, magneto-optic disk, or other disk on which data signals are recorded. More particularly, the present invention relates to a disk cartridge for protecting the disk accommodated in the cartridge body.

BACKGROUND OF THE INVENTION

In the past, optical disks, magneto-optic disks, and other disks on which data signals have been recorded have been accommodated in disk cartridges so as to prevent dust etc. from adhering to the disks or scratches being made on the main surfaces of the disks where the data signal recording portions are formed during storage, or fingerprints etc. being made on the surface of the disks by direct; contact of the fingers on the disks when loading them into the recording and/or reproduction apparatuses, and further to facilitate loading of the disks in the recording and/or reproduction apparatuses. That is, the disks have been rotatably accommodated in the disk cartridges and have been handled while accommodated in the disk cartridges.

Figure 1:
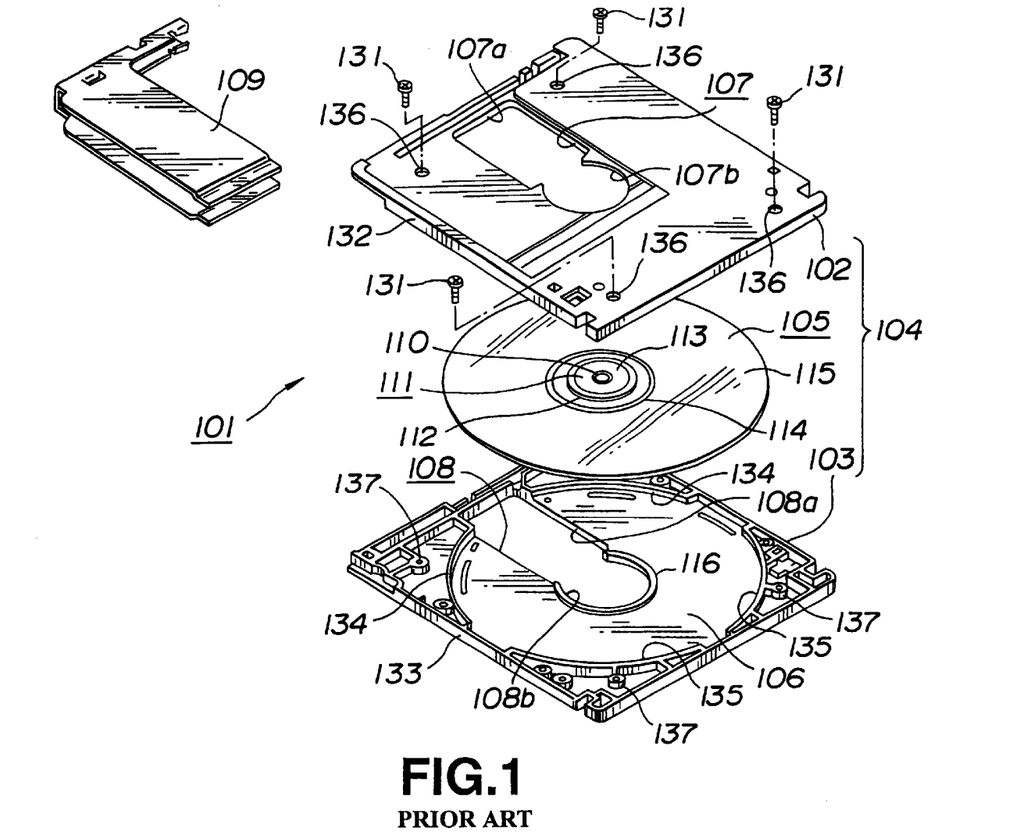
FIG. 1 is a disassembled perspective view of a conventional disk cartridge.
Figure 2:
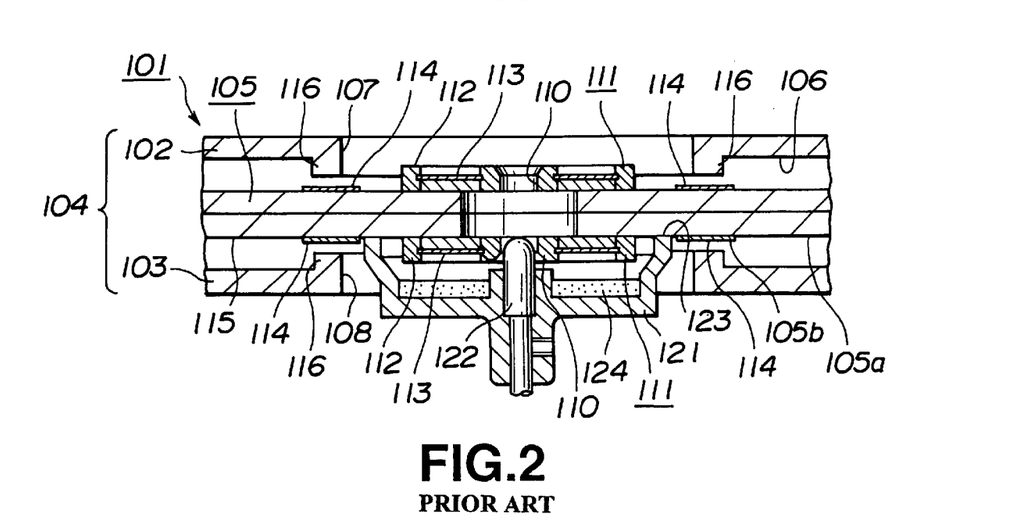
FIG. 2 is a cross-sectional view of key parts showing the state of a disk accommodated in the disk cartridge loaded on a disk table.

This type of disk cartridge 101, as shown in FIG. 1 and FIG. 2, is provided with a cartridge body 104 formed by mating an upper and lower half 102 and 103 formed by molding a plastic material into substantially square shapes and connecting them near their corners by screws 131. This cartridge body 104 accommodates an optical disk, magneto-optic disk, or other disk 105 serving as the recording media for the data signals. The screws 131 for connecting the upper and lower halves 102 and 103 are screwed through the screwing portions 136 and 137 provided at the upper half 103. At the peripheries of the mateable upper and lower halves 102 and 103 are integrally formed walls 132 and 133 which may be mated to constitute the circumferential walls of the cartridge body 104.

In the cartridge body 104 is formed a disk accommodating space 106 of a circular shape of a diameter larger than the outer diameter of the disk 105 and a thickness greater than the thickness of the disk 105. The disk 105 is rotatably accommodated a disk 106. The disk accommodating space 106 is comprised by mating the arc-shaped ribs 134 and 135 projecting from the facing inner surfaces of the upper and lower halves 102 and 103 so as to be inscribed by the walls 132 and 133 formed at the peripheries of the upper and lower halves 102 and 103.

At the top and bottom surfaces of the cartridge body 104 from the center to the front are openings 107 and 108 for allowing the approach of a disk table 121 of a disk rotating mechanism arranged inside the recording and/or reproduction apparatus in which the disk cartridge 101 is loaded and a pickup apparatus constituting the recording and reproduction means for recording and/or reproducing predetermined data signals to and/or from the disk 105 being rotated by the disk table rotation mechanism. These openings 107 and 108 are closed by the shutter member 109 provided slidably on the cartridge body 104 and are opened only during use when the disk cartridge 101 is loaded in the recording and/or reproduction apparatus. Entry of dust etc. into the cartridge body 104 is prevented during non-use, contact of the fingers with the signal recording region 105a of the disk 105 is prevented, and recording and reproduction error of the data signals caused by deposition of dust or fingerprints on the signal recording region 105a are prevented.

Further, at the centers of the two main surfaces of the disk substrate 115 on which the signal recording region 105a of the disk 105 is formed and made of mainly a plastic substrate are provided hubs 111 having center holes 110 for engagement with a center spindle 122 provided at the center of the disk table as shown in FIG. 1. These hubs 111 are comprised of ring members 112 comprised of plastic and metal plates 113 having magnetic characteristics attached integrally to the ring members 112.

The disk cartridge 101 configured in this way is positioned for loading by engaging a positioning hole (not shown) formed in the main surface at the bottom side of the cartridge body 104 with a positioning pin provided in the recording and/or reproduction apparatus and then is loaded in the cartridge loader in the recording and/or reproduction apparatus. The disk 105 accommodated in the disk cartridge 101 loaded in the cartridge loader, as shown in FIG. 2, is loaded on the disk table 121. The disk table 121 has at its center a center spindle 122 for engaging with a center hole provided in a hub 111 of the disk 105 and uses the top surface of its outer circumference as the disk receiving surface 123 supporting the non-signal recording region 105b of the disk 5 positioned at the outer periphery of the hub 111. Further, at the inner circumference of the disk table 121, a ring-shaped magnet 124 for magnetically attracting the metal plate 113 attached to the hub 111 is provided around the center spindle 122. By bringing the center into register with the center spindle 122 and providing the ring-shaped magnet 124, a uniform magnetic field is applied to the hub 111 of the disk 105 loaded on the disk table 121.

Note that the disk table 121 is designed so that when supporting the disk 105, the signal recording region 105a faces the pickup device, so is made smaller in diameter than the non-signal recording region 105b provided at the inner circumference of the disk substrate 115.

Further, the disk cartridge 101 that rotatably accommodates the disk 105 is provided with a disk support 116 projecting out from the inner surface of the cartridge body 104 so as to prevent the disk 105 and the cartridge body 104 from coming into sliding contact, and to prevent the signal recording region 105a of the disk 105 from being scratched during transport etc. This disk support 116 is formed so as to surround the periphery of the disk table entry openings 107b, 108b formed at the center of the cartridge body 104 connected to the recording and reproduction openings 107a and 108a of the openings 107 and 108 which the pickup device approaches. The disk support 116 formed at this position supports the non-signal recording region 105b at the inner circumference portion of the disk 105 at the top surface and keeps the signal recording region 105a of the disk 105 and the inner surface of the cartridge body 104 from coming into contact.

A disk cartridge 101 configured in this way may be handled alone and used loaded into a recording and/or reproduction apparatus one at a time. Sometimes, however disks are used and stored in a recording and/or reproduction apparatus that has a disk exchange mechanism which is provided with a storage unit having with a plurality of cartridge storage portions that selectively takes out the plurality of disk cartridges 101 stored in the storage unit for recording and/or reproduction of the data signals. The recording and/or reproduction apparatus provided with such a disk exchange mechanism is able to exchange disk cartridges 101 for recording and/or reproduction of data signals by selectively taking out a plurality of disk cartridges 101 stored in the storage unit and recording and/or reproducing the data signals, which enables a large volume of data signals to be easily and continuously recorded and/or reproduced.

With a recording and/or reproduction apparatus provided with a disk exchange mechanism, however, to make it possible to record and/or reproduce data signals continuously with respect to a plurality of disk cartridges 101 without large time intervals, it is necessary to transport the cartridges between the storage unit and the cartridge loader at a high speed. That is, it is necessary to exchange the disk cartridges 101 at an extremely high speed. If the disk cartridges are transported at a high speed, a large shock will end up being given to the disk cartridges. As a result, the disks 5 accommodated rotatably in the cartridge bodies 4 will shake in the cartridge bodies 4 and the disks 105 and the disk supports 116 supporting the disks 105 will end up repeatedly striking each other.

Further, the cartridge body 104 for accommodating the disk 105 is formed by a plastic having excellent shapeability and sufficient mechanical strength, such as a polycarbonate resin. On the other the disk 105, in consideration of the resistance to humidity, resistance to heat, etc., has the disk substrate 115, on which the recording film constituting the signal recording layer is provided, that is formed by a polycarbonate resin. In this way, even when similar materials are used for the material constituting the cartridge body 104 and the material constituting the disk substrate 115, with a disk cartridge 101 which supports the disk 105 by a disk support 116 provided integrally on the inner surface of the cartridge body 104 by the same material as the material constituting the cartridge body 104, frequent sliding contact between the disk 105 and the cartridge support 116 during transport for exchange etc. will sometimes result in ring-like scratches on the disk 105. Further, the surface of the disk support 116 provided on the cartridge body 104 will sometimes become worn.

Further, the surface of the disk 105 to be accommodated in the disk cartridge 101 is formed to be generally smooth and the disk support surface of the disk support 116 is formed as a smooth surface of a certain width. Accordingly, the area of contact of the disk 105 and the disk support 116 becomes large. The disk 105 rotatably accommodated in the disk cartridge 101 can move within a certain range in the cartridge body 104. Therefore, when a shock is applied to the disk cartridge 101 during transport such as exchange and the disk 105 shakes in the cartridge body 104 and engages in repeated sliding contact with the disk support 116, the scratching and wear of the surface of the disk 105 and the disk support surface of the disk support 116 will become great and the generation of dust will become severe.

When this dust is generated and accumulates at the inside of the cartridge body, the dust will adhere to the signal recording regions of the disk. If dust adheres to the signal recording regions, then losses will occur in the recording and/or reproduction of the data signals on the disk 5.

In particular, this problem is serious when the disk accommodated in the disk cartridge is an optical disk. The optical beam emitted from the optical head device will be prevented from reaching the recording layer due to the dust adhering on the optical disk, the rise of temperature of the recording layer at the portion irradiated by the optical beam will be hindered, the amount of light returning from the recording layer will be reduced, and the S/N ratio at the time of reproduction will end up deteriorating. Further, the adhesion of dust on the object lens of the optical head can also make recording and/or reproduction of the data signals completely impossible.

Further, a recording and reproduction apparatus using a rewritable magneto-optic disk as a recording medium adopts a reproduction system detecting the signals recorded on the magneto-optic disk by the minute rotation of the linear polarization plane of the optical beam irradiated on the magneto-optic disk, so the generation of dust becomes a serious problem. That is, if dust adheres to the signal recording region of the magneto-optic disk, sometimes production of the data signals becomes completely impossible.

Figure 3:
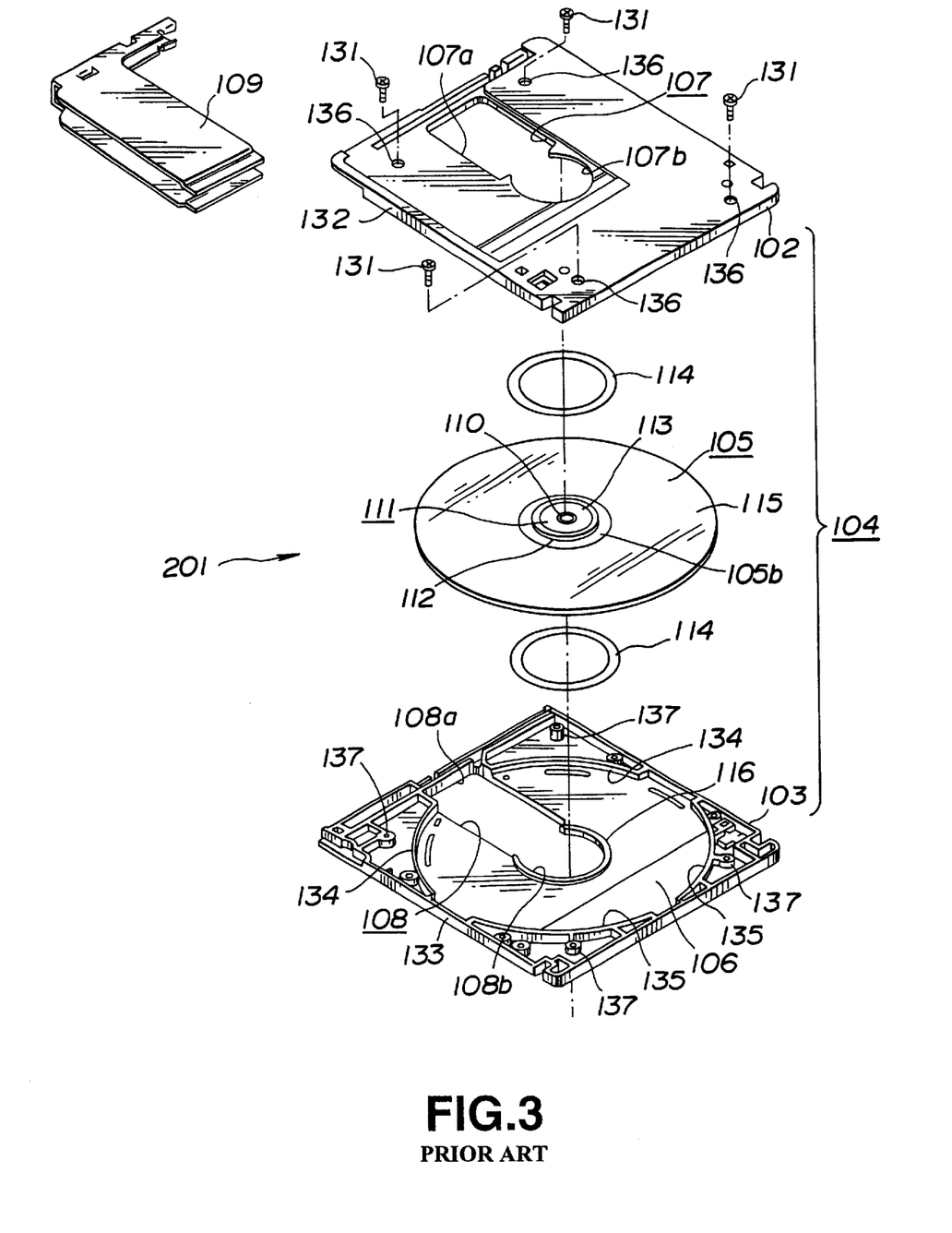
FIG. 3 is a disassembled perspective view of another conventional disk cartridge.

Therefore, a disk cartridge, that prevents the generation of dust caused by wear due to the sliding contact between the disk and cartridge body, such as the configuration of FIG. 3, has been proposed. The disk cartridge 201 shown in FIG. 3 has a ring-shaped sheet 114 of superior lubricity adhered by an adhesive etc. to the non-signal recording region 105 provided at the inner circumference of the disk 105 supported by the disk support 116 provided at the cartridge body 104.

The disk 105 accommodated in the disk cartridge 201 is supported via the sheet 114 having the lubricity by the disk support 116 which is formed so as to surround the peripheries of the disk table entry openings 107b and 108b in the openings 107 and 108 formed in the cartridge body 104.

By providing the sheet 114 with superior lubricity at the portion supported by the disk support 116 in this way, it is possible to suppress the generation of dust caused by the sliding contact of the disk 105 and the disk support 116.

However, when adhering a sheet 114 of such superior lubricity to the disk 105, a special punching die is required for punching the sheet material into that shape, and further a step of adhering the sheet material becomes necessary in the process of production of the disk 105, so the production of the disk cartridge becomes complicated and the production costs end up being made higher. In particular, it is extremely difficult to bring the entire surface of the ring-shaped sheet 114 into close contact with the disk 105 for even adhesion.

Figure 4:
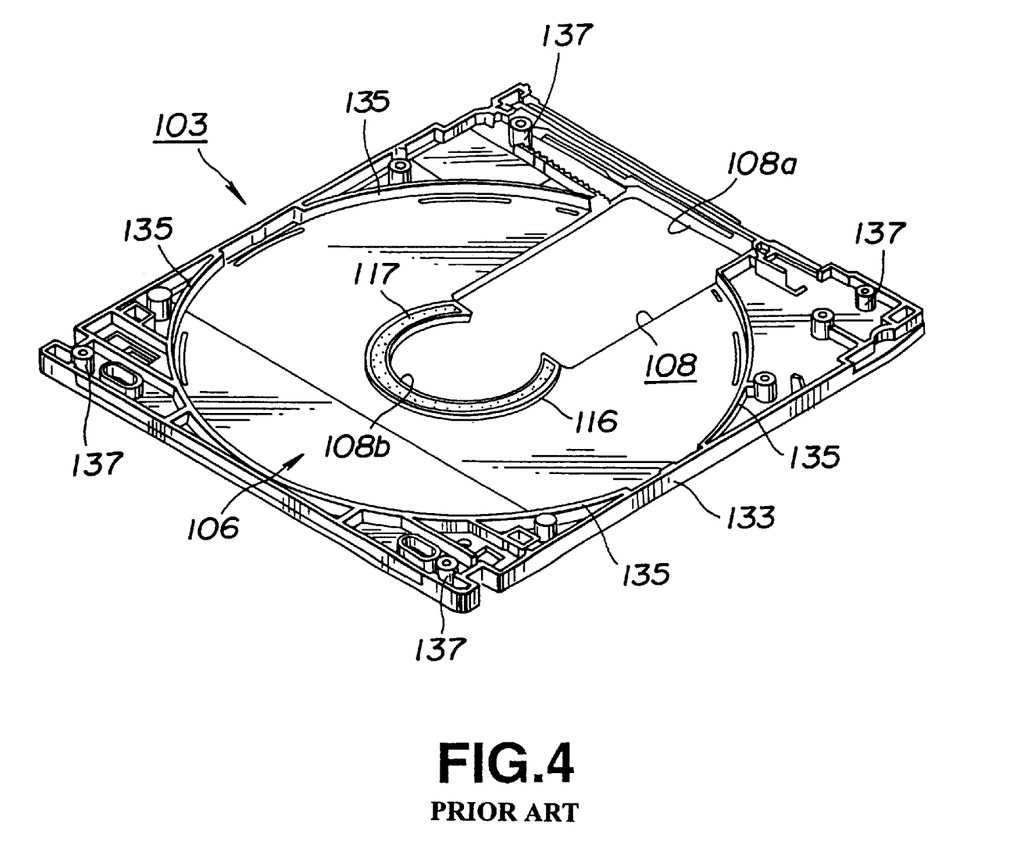
FIG. 4 is a perspective view of a lower half of still another conventional disk cartridge.

Further, as shown in FIG. 4, there has been proposed a disk cartridge where a disk support member, comprised of a polyacetal resin, which is superior in lubricity, is attached by bonding or ultrasonic welding to the entire disk support surface of the disk support 116 which projects out from the cartridge body 104 and supporting the disk 105.

With such a disk cartridge, it is necessary to form a disk support member 117 corresponding in shape to the disk support 116 by molding the polyacetal resin, so it is necessary to prepare a special mold for making the disk support member 117. Accordingly, the production of the disk cartridge becomes complicated and the production costs end up being made higher. In particular, it is difficult to bring all of the surface of a continuous disk support member into close contact with the disk support 116 for attachment and there is a concern over an inability to support the disk 105 stably.

DISCLOSURE OF THE INVENTION

The object of the present invention is to provide a disk cartridge which prevents scratches from being made on the disk accommodated in the cartridge body and wear of the disk support provided at the cartridge body and also prevents the generation of dust due to the wear during sliding contact of the cartridge body and the disk and thereby is free from the generation of losses of data signals during recording and/or reproduction.

Another object of the present invention is to provide a disk cartridge which facilitates the attachment of the disk support member to the disk support and thereby enables reliable attachment.

Still another object of the present invention is to enable the easy production of a disk cartridge able to prevent scratches on the disk and wear of the disk support provided on the cartridge body and able to prevent the generation of dust due to wear and to provide the same inexpensively.

The disk cartridge according to the present invention, proposed so as to achieve the above objects, is provided with a cartridge body which is formed by an upper half and a lower half mated and connected together and which accommodates a disk on which data signals are recorded. A disk support is provided at least at one of the facing inner surfaces of the cartridge body corresponding to the non-signal recording region of the inner periphery of the disk. Disk support members with a high wear resistance and high lubricity are arranged spread in a ring at predetermined intervals at the surface of the disk support facing the disk.

The disk support members are formed as thin pieces and are joined to said disk support by an adhesive.

The disk support members used here are formed by sheet-like members of ultra-high molecular weight polyethylene or by sheet-like members of polyfluoroethylene fiber.

The disk support at which the disk support members are arranged has a substantially horseshoe shape having a cutaway portion at the side facing the recording and/or reproduction use opening formed in the cartridge body. The disk support members are arranged at a plurality of locations spread at equal intervals in the circumferential direction of the substantially horseshoe shaped support.

More specifically, the disk support members are arranged at five locations spread at equal intervals in the circumferential direction of said substantially horseshoe shaped support.

Further, the disk support members may be arranged at three locations spread at equal intervals in the circumferential direction of said substantially horseshoe shaped support.

Further, in the disk cartridge according to the present invention, the disk support members are arranged at the disk supports provided at the facing inner surfaces of the upper and lower halves.

BEST MODE FOR CARRYING OUT THE INVENTION

Below, specific examples of a disk cartridge to which the present invention is applied will be explained with reference to the drawings.

Figure 5:
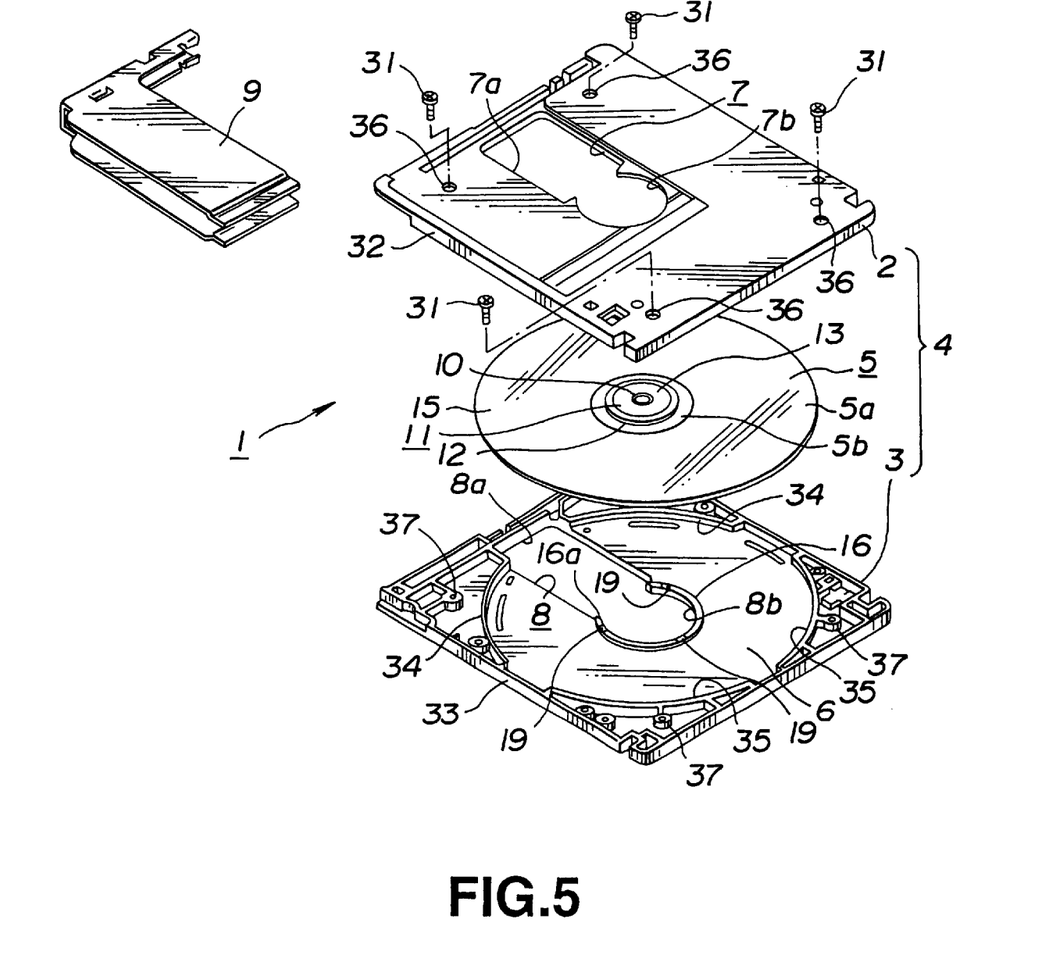
FIG. 5 is a disassembled perspective view of a disk cartridge according to the present invention.

The disk cartridge 1 according to the present invention, as shown in FIG. 5, is provided with a cartridge body 4 comprised by mating an upper and lower half 2 and 3 formed by molding a plastic material into substantially square shapes and connecting them near the corners by screws 31. The cartridge body 4 accommodates an optical disk, magneto-optic disk, or other disk 5 serving as the recording medium for data signals. At the top and bottom surfaces of the cartridge body 4 extending from the center to the front are made openings 7 and 8 for allowing the approach of a disk table of a disk rotating mechanism arranged inside the recording and/or reproduction apparatus in which the disk cartridge 1 is loaded and a pickup apparatus or other recording and reproduction means for recording and/or reproducing predetermined data signals to and from the disk 5 being rotated by the disk rotation drive mechanism. These openings 7 and 8 are closed by the shutter member 9 provided slidably on the cartridge body 4 and are opened only during use when the disk cartridge 1 is loaded in the recording and/or reproduction apparatus. Entry of dust etc. into the cartridge body 4 is prevented during non-use, contact of the fingers with the signal recording region 5a of the disk 5 is prevented, and recording and reproduction error of the data signals caused by deposition of dust or fingerprints on the signal recording region 5a are prevented.

The upper half 2 and the lower half 3 constituting the cartridge body 4 is formed by a plastic excellent in shapeability and having sufficient mechanical strength, for example, a polycarbonate resin. The upper half 2 and the lower half 3 constitute a space large enough for rotatably accommodating the disk 5 when mated and connected to form the cartridge body 4. At the peripheries of the upper half 2 and lower half 3 are formed the walls 32 and 33 which are mated and joined to constitute the circumferential wall of the cartridge body 4. The facing inner surfaces of the upper half 2 and lower half 3 have a plurality of arc-shaped ridges 34 and 35 constituting the positioning walls for defining the position of accommodation of the disk 5 accommodated in the cartridge body 4 in the horizontal direction and constituting the disk accommodating space 6. These arc-shaped ridges 34 and 35 are positioned on a circle larger than the outer diameter of the disk 5 accommodated in the cartridge body 4 so as to be inscribed by the walls 32 and 33.

Further, the recording and/or reproduction openings 7 and 8 are formed with substantially rectangular shapes in the top and bottom surfaces of the cartridge body 4, that is, from the center portions of the upper half 2 and the lower half 3 to the front side edges of the side where the shutter member is attached and formed so as to enable the portion from near the outer circumferential end of the disk 5 accommodated in the cartridge body 4 toward the center portion to be close to the outside of the cartridge body 4. By forming the openings 7 and 8 in this way, it becomes possible for the data signal writing and reading means to scan along the inner and outer circumferences of the disk 5. Also, the disk table of the disk rotation mechanism provided at the recording and/or reproduction side driving the rotation of the disk 5 can enter the cartridge body 4 through the openings 7 and 8 and support the disk 5.

Note that the recording and/or reproduction openings 7 and 8 are comprised of the circular disk table entry openings 7b and 8b positioned at the center of the cartridge body 4 and the recording and/or reproduction openings 7a and 8a formed connected to the openings 7b and 8b and extending toward the front of the cartridge body 4 to enable approach by an optical pickup device or other recording and/or reproduction means.

Figure 6:
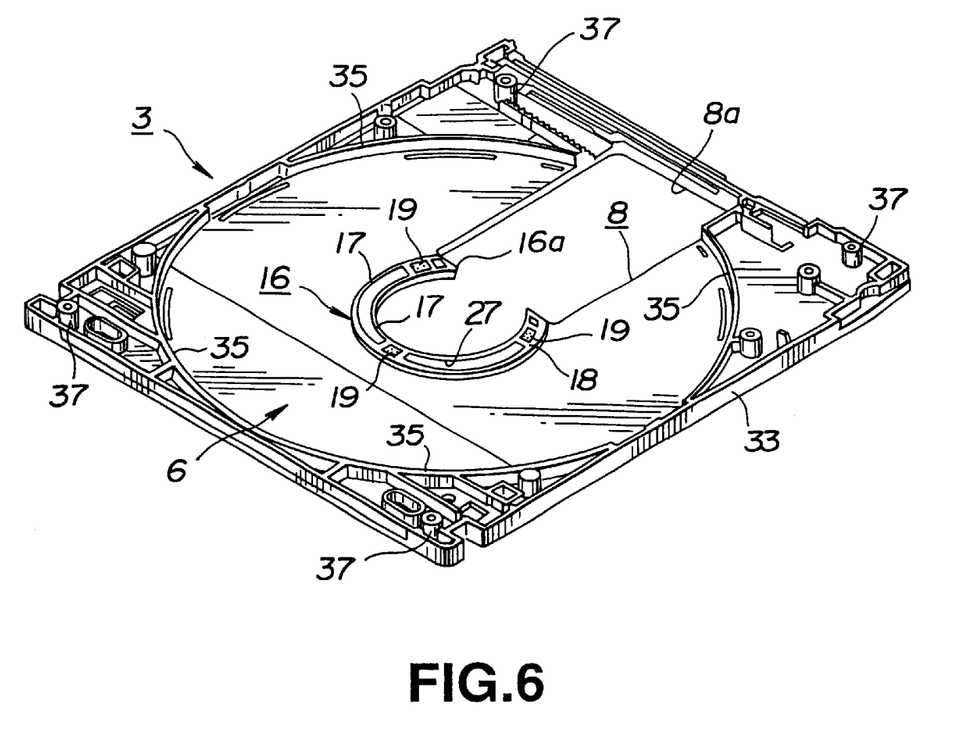
FIG. 6 is a perspective view of a lower half of the above disk cartridge.

Disk supports 16 are provided so as to project out to the inside of the cartridge body 4 at the peripheries of the disk table entry openings 7b and 8b constituting the openings 7 and 8, that is, at positions corresponding to the non-signal recording region 5b of the inner circumference of the disk 5 accommodated in the cartridge body 4. That is, the disk supports 16 are formed in substantially horseshoe shapes, as shown in FIG. 5 and FIG. 6, having cutaway portions 16a at the sides facing the openings 7 and 8.

The disk supports 16 are provided at the facing inner surfaces of the upper half 2 and the lower half 3 and are comprised of two arc-shaped ribs 17 formed so as to doubly surround the circular disk table entry openings 7b and 8b. A plurality of projections 18 having the same height as the arc-shaped ribs 17 are formed positioned in the indented portion 27 between the two arc-shaped ribs 17 and spread at certain intervals in the circumferential direction of the disk supports 16. On the top surfaces of the projections 18 facing the disk 5 are provided disk support members 19 formed as thin pieces of a square shape and comprised of a material with a high wear resistance and a high lubricity, for example, ultra-high molecular weight polyethylene. That is, a plurality of disk support members 19 are provided at certain intervals from each other in rings on the facing inner surfaces of the upper half 2 and the lower half 3. Here, the disk support members 19 are adhered to the projections 18 using an adhesive.

As the material constituting the disk support members 19 used here, use may be made of ultra-high molecular weight polyethylene sheet punched out to a certain shape, a sheet-like member comprised of polyfluoroethylene fiber punched out to a certain shape, and a sheet-like material of a high wear resistance coated or impregnated with a material superior in lubricity. Disk support members 19 comprised of these materials are preferably adhered to the projections 18 using an adhesive.

Figure 7:
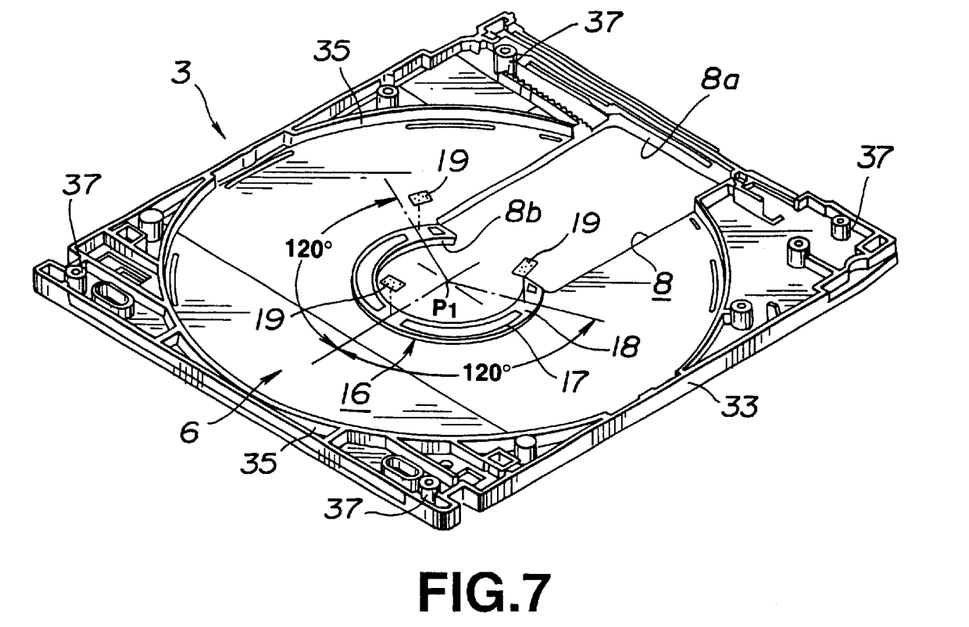
FIG. 7 is a perspective view of a lower half for explaining the positions for attachment of the disk support members.

The projections 18 where the disk support members 19 are provided are formed at three locations at equal intervals, as shown in FIG. 7, in the circumferential direction of the substantially horseshoe shaped disk supports 16. Here, the projections 18 are formed at equal intervals of 120 degrees about a center $P_1$ of a disk table entry opening 8b formed in the substantially horseshoe-shaped disk support 16 along its periphery. Forming the projections 18 at equal intervals about a center $P_1$ of the disk table entry opening 8b in this way is advantageous when adhering the disk support members 19. At that time, the upper half 2 or the lower half 3 is turned about the center of the disk table entry opening 8b and the members are adhered one at a time. That is, control of the adhering position becomes easy when adhering disk support members 19 using an automatic assembler.

Figure 8:
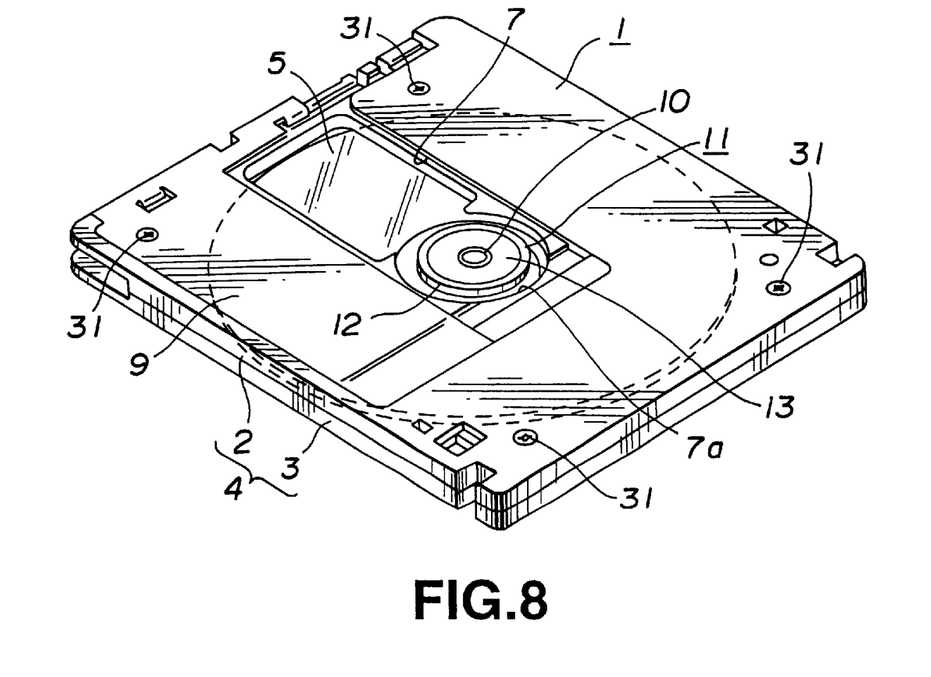
FIG. 8 is a perspective view of a cartridge body accommodating a disk.

The upper half 2 and the lower half 3 provided at the inner surfaces with the plurality of arc-shaped ridges 34 and 35 defining the disk accommodating space 6 and the disk support members 19 arranged spread in rings at the disk supports 16 supporting the non-signal recording region 5b at the inner circumference of the disk 5 are designed to accommodate a disk 5 in the disk accommodating space 6. The screwing portions 36 and 37 provided at facing positions at the corners of the halves 2 and 3 are mated and connected and affixed by screwing screws 31 through the screwing portions 36 and 37. As shown in FIG. 8, this constitutes the cartridge body 4 rotatably accommodating a disk 5.

Figure 9:
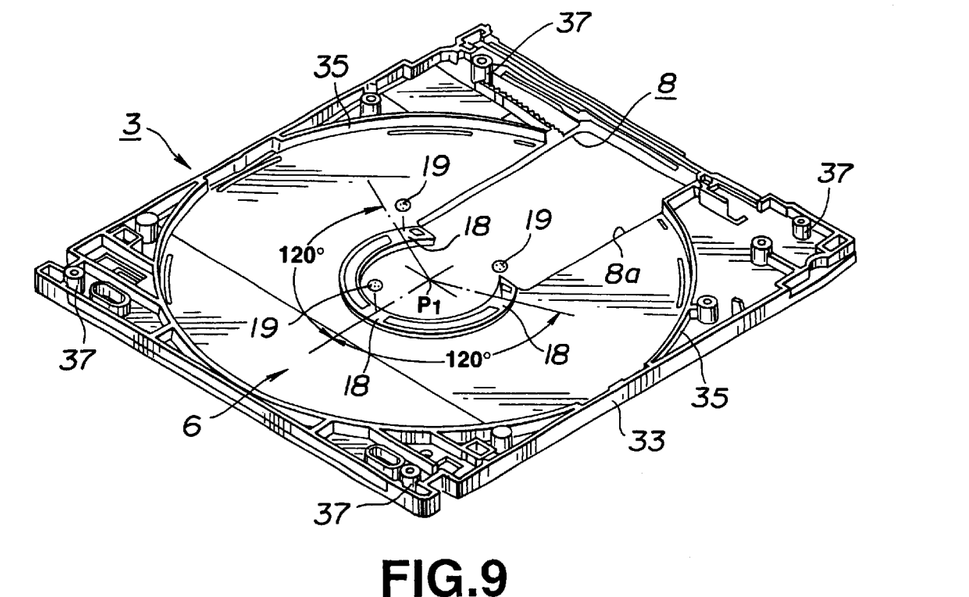
FIG. 9 is a perspective view of a lower half for explaining the attachment of sheet-like disk support members of another example.

In the above-mentioned embodiment, the disk support members 19 used are ones made of sheet materials of a high wear resistance and high lubricity formed into squares, but as shown in FIG. 9 use may also be made of ones formed into circles.

Figure 10:
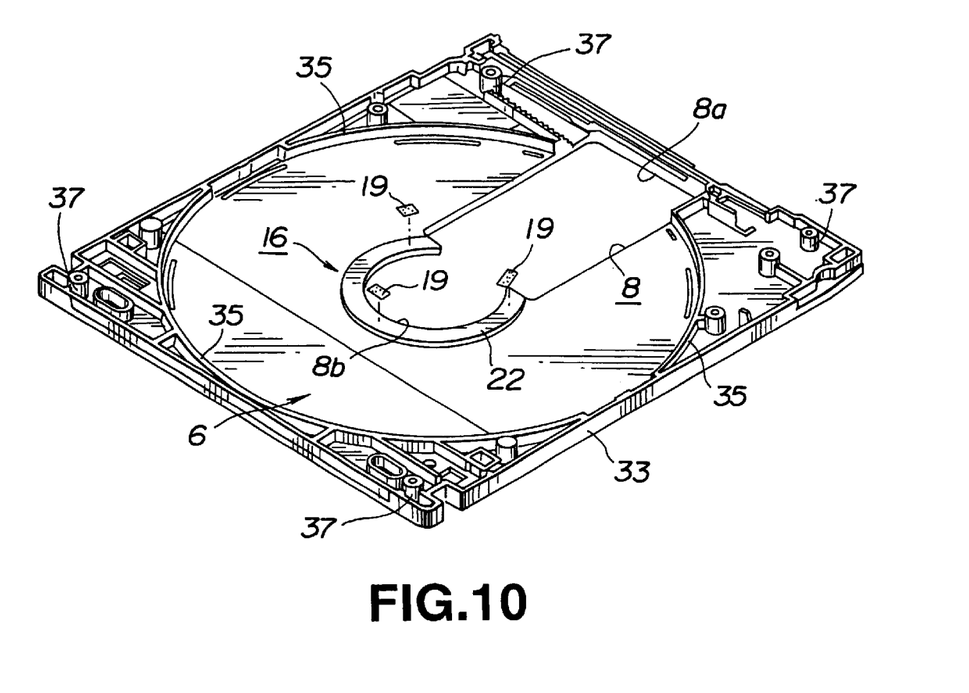
FIG. 10 is a perspective view of a lower half showing the shape of another example of projections for attachment of the disk support members.

Further, the disk support 16 on which the disk support members 19 are provided, as shown in FIG. 10, may have a surface facing the disk formed smooth over its entire length and use that smooth surface as the attachment portion 22 for the disk support members 19. In this case, the plurality of disk support members 19 are adhered to the attachment portion 22 using an adhesive and spread at equal intervals suitable distances apart.

Figure 11:
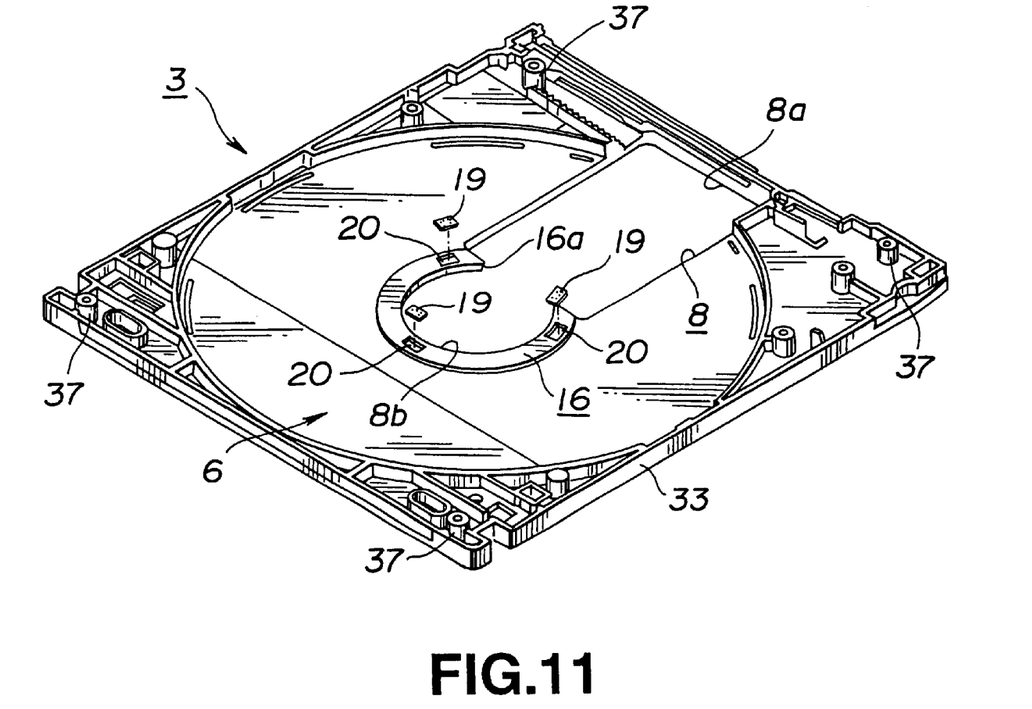
FIG. 11 is a perspective view of a lower half for showing the shape of still another example of the projections for attachment of the disk support members.
Figure 12:
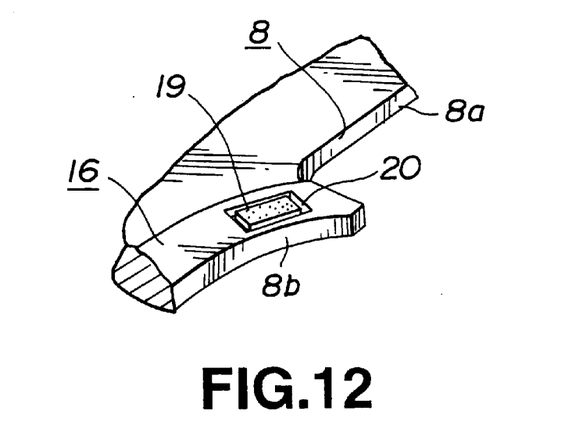
FIG. 12 is an enlarged perspective view of projections for attachment of the disk support members in the lower half shown in FIG. 11.

When providing the disk support members 19 on a disk support 16 having a surface facing the disk 5 made smooth over its entire length, a plurality of depressions 20 shallower than the thickness of the disk support members 19 to be provided there may be provided as shown in FIG. 11 and FIG. 12 in the surface of the disk support 16 facing the disk 5. In these depressions 20 are provided the disk support members 19 as shown in FIG. 12. In this case, when using an adhesive for bonding when attaching the disk support members 19 in the depressions 20, the excess adhesive can be absorbed by the depressions 20. Accordingly, it becomes possible to prevent leakage of the adhesive used for bonding the disk support members 19 to the surface of the disk support and prevent deposition of the adhesive to the disk 5. Further, by arranging the disk support members 19 in the depressions 20, it becomes possible to prevent easy peeling of the disk support members 19 from the disk support 16 and to support the disk 5 reliably by the disk support members 19.

The above-mentioned disk cartridges have disk support members 19 arranged at three locations at equal intervals in the circumferential direction of the substantially horseshoe shaped disk support 16, but it is also possible to increase the number of the disk support members arranged at the disk support 16.

Figure 13:
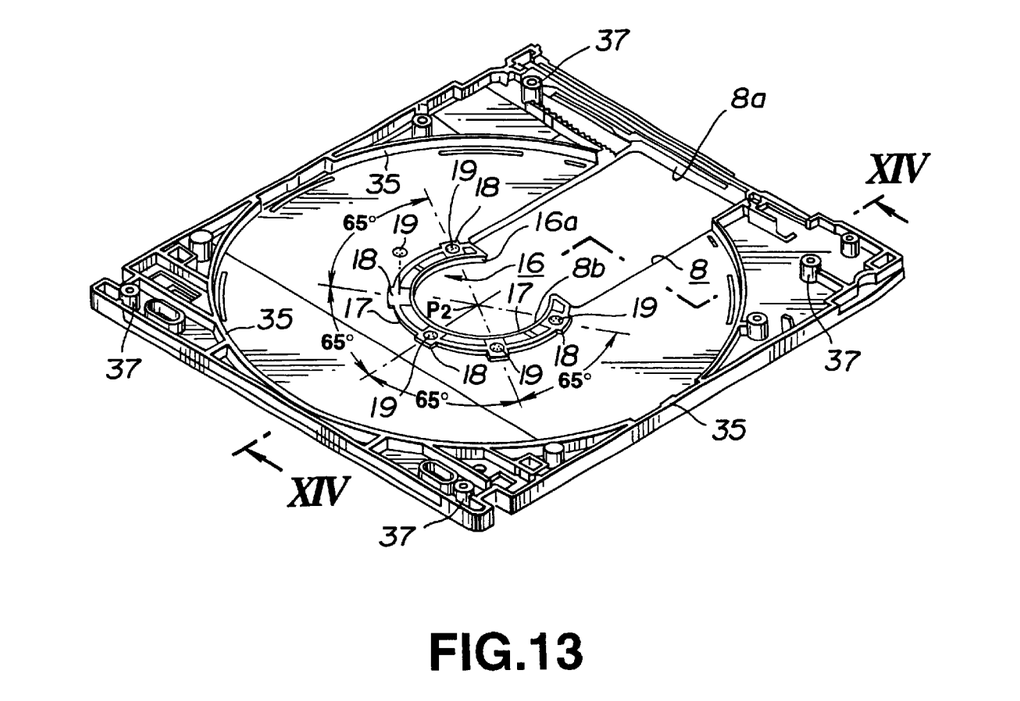
FIG. 13 is a perspective view of a lower half for showing an example of arrangement of disk support members at five locations.

For example, as shown in FIG. 13, in the circumferential direction of the disk support 16, which is comprised of two arc-like ribs 17 and is formed in a substantially horseshoe shape, provision is made of projections 18 on which disk support members 19 are arranged at five locations at equal intervals. Here, the projections 18, as shown in FIG. 13, are formed at equal intervals of approximately 65 degrees about the center $P_2$ of the disk table entry opening 8b formed along the periphery of the substantially horseshoe shaped disk support 16. The disk support members 19 are adhered to the top surfaces of the projections 18 facing the disk 5 using an adhesive.

Figure 14:
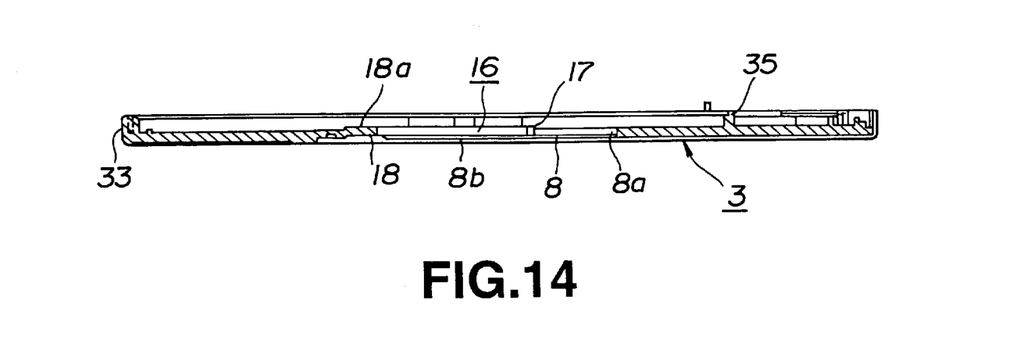
FIG. 14 is a cross-sectional view along line XIV—XIV of FIG. 13.

However, the surfaces 18a of the projections 18 to which the disk support members 19 are to be adhered, as shown in FIG. 14, are preferably made as smooth as possible. By making the surfaces 18a to which the disk support members 19 are to be adhered in this way smooth mirror surfaces, it becomes possible to adhere disk support members 19 comprised of sheet-like members comprised of ultra-high molecular weight polyethylene or polyfluoroethylene fiber and other materials of a superior lubricity using an adhesive. That is, the disk support members 19 comprised of the ultra-high molecular weight polyethylene sheet or polyfluoroethylene fiber or other material with superior lubricity has an extremely high smoothness. To adher these smooth disk support members 19 with a good bonding by an adhesive, it is preferable to make the surfaces 18a to which the disk support members 19 are to be adhered as smooth as possible.

Further, even when these disk support members 19 are provided at five locations, the disk support 16 on which they are provided may be of the form of any of the embodiments mentioned above.

In this way, by arranging the disk support members 19 spread out at five locations or more than five locations, it becomes possible to support the disk accommodated in the cartridge body 4 more reliably by the disk support members 19 and becomes possible to reliably protect the disk 5.

The disk cartridge according to the present invention has a plurality of disk support members of a high wear resistance and high lubricity arranged spread over the disk supports which are provided at the facing inner surfaces of the cartridge body corresponding to the non-signal recorded region at the inner circumferential portion of the disk to be accommodated in the cartridge body, so it is possible to arrange these disk support members at the disk supports and possible to prevent scratching due to sliding contact between the cartridge body and the disk and the generation of dust caused by the wear from this scratching. Further, attachment of the disk support members to the disk supports becomes easy, so production of the disk cartridge becomes easy and provision at a low cost becomes possible.

What is claimed is:

1. A disk cartridge comprising:
    a cartridge body formed by mating and connecting an upper half and a lower half,
    a disk accommodated rotatably in said cartridge body and having data signals recorded on it,
    a disk support projecting from at least one of the facing inner surfaces of the cartridge body corresponding to the non-signal recording region of the inner periphery of the disk,
    a plurality of disk support members made of ultra-high molecular weight polyethylene to provide a high wear resistance and high lubricity, the disk support members being arranged in a ring at predetermined intervals on a surface of the disk support facing the disk, and
    a recording and/or reproduction use opening formed in the cartridge body, wherein said disk support is formed in a substantially horseshoe shape having a cutaway portion at a side facing the recording and/or reproduction use opening and said disk support members are adhered at a plurality of locations on the horseshoe shaped disk support so that each of said plurality of locations have a projection that forms an enlarged mounting area on the horseshoe shape disk support relative to non-enlarged adjacent areas of the horseshoe shaped disk support, the plurality of locations being spread at equal intervals in the circumferential direction of said substantially horseshoe shaped disk support,
    wherein said disk support members are arranged at least at three locations spread at equal intervals in the circumferential direction of said substantially horseshoe shaped disk support.

2. A disk cartridge as set forth in claim 1, wherein said disk support members are arranged at five locations spread at equal intervals in the circumferential direction of said substantially horseshoe shaped disk support.

3. A disk cartridge as set forth in claim 1, further comprising:
    a second disk support projecting from the other of the one facing inner surfaces, wherein said disk support members are arranged in rings at predetermined intervals on surfaces of the disk supports, the disk supports project from the facing inner surfaces of the cartridge body and face the disk.

4. A disk cartridge comprising:
    a cartridge body formed by mating and connecting an upper half and a lower half, said cartridge body forming a recording and/or reproduction use opening therein,
    a disk rotatably accommodated in said cartridge body and having data signals recorded thereon,
    a disk support projecting from at least one of the facing inner surfaces of the cartridge body corresponding to the non-signal recording region of the inner periphery of the disk, said disk support is formed in a substantially horseshoe shape having a cutaway portion at a side facing the recording and/or reproduction use opening, and
    a plurality of disk support members each formed of thin sheet-like members of ultra-high molecular weight polyethylene having high wear resistance and high lubricity, the plurality of disk support members being adhered to the horseshoe shaped disk support facing the disk and spread at equal intervals in the circumferential direction of said substantially horseshoe shaped disk support, wherein each of said plurality of locations is formed as a projection that has a larger area than adjacent non-projecting portions of the horseshoe shaped disk support.

5. A disk cartridge as set forth in claim 4, wherein said disk support members are arranged at five locations spread at equal intervals in the circumferential direction of said substantially horseshoe shaped disk support.

* * * * *

UNITED STATES PATENT AND TRADEMARK OFFICE
CERTIFICATE OF CORRECTION

PATENT NO.     : 6,366,553 B1
DATED          : April 2, 2002
INVENTOR(S)    : Takahashi It is certified that error appears in the above-identified patent and that said Letters Patent is hereby corrected as shown below:

<u>Title page,</u>
Item [86], should read as follows:
-- [86]   PCT No.:         PCT/JP95/02771
          § 371 Date:      Dec. 23, 1996
          § 102(e) Date:   Dec. 23, 1996 --

Signed and Sealed this

Seventeenth Day of September, 2002

*Attest:*

*Attesting Officer*

JAMES E. ROGAN
*Director of the United States Patent and Trademark Office*